United States Patent
Lai et al.

(10) Patent No.: US 10,359,879 B2
(45) Date of Patent: Jul. 23, 2019

(54) TOUCH CONTROL DISPLAY PANEL AND DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Qingjun Lai, Xiamen (CN); Zhaokeng Cao, Xiamen (CN); Poping Shen, Xiamen (CN); Xiufeng Zhou, Xiamen (CN); Yihua Zhu, Xiamen (CN); Zhaodong Zhang, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 148 days.

(21) Appl. No.: 15/353,014

(22) Filed: Nov. 16, 2016

(65) Prior Publication Data
US 2017/0068386 A1  Mar. 9, 2017

(30) Foreign Application Priority Data

Jul. 29, 2016  (CN) .......................... 2016-1-0617689

(51) Int. Cl.
G06F 3/041 (2006.01)
G06F 3/044 (2006.01)
(52) U.S. Cl.
CPC ............ *G06F 3/0416* (2013.01); *G06F 3/044* (2013.01); *G06F 3/0412* (2013.01)

(58) Field of Classification Search
None
See application file for complete search history.

(56) References Cited

U.S. PATENT DOCUMENTS

2010/0164889 A1* 7/2010 Hristov ................. G06F 3/0416
345/173
2013/0207924 A1* 8/2013 Mohindra ............... G06F 3/044
345/174
(Continued)

FOREIGN PATENT DOCUMENTS

CN  104331196 A  2/2015
CN  104520792 A  4/2015
(Continued)

*Primary Examiner* — Amare Mengistu
*Assistant Examiner* — Sarvesh J Nadkarni
(74) *Attorney, Agent, or Firm* — Anova Law Group, PLLC

(57) ABSTRACT

A touch control display panel and a display device are provided. The touch control display panel may comprise a plurality of touch driving electrodes arranged in a first direction; a touch sensing electrode array including a plurality of touch sensing electrode rows arranged in a second direction, wherein a touch sensing electrode row includes a first touch sensing electrode and a second touch sensing electrode arranged in the first direction. In a same touch sensing electrode row, a gap is provided between the first touch sensing electrode and the second touch sensing electrode, and the gap has a width of $w_1$ in the first direction, the touch driving electrode disposed opposite to and over the gap between the first touch sensing electrode and the second touch sensing electrode has an electrode width of $w_2$ in the first direction, and the gap width $w_1$ is smaller than the electrode width $w_2$.

20 Claims, 12 Drawing Sheets

(56) References Cited

U.S. PATENT DOCUMENTS

| | | | | |
|---|---|---|---|---|
| 2014/0043278 A1* | 2/2014 | Rebeschi | ............. | G06F 3/0416 |
| | | | | 345/174 |
| 2015/0022494 A1* | 1/2015 | Azumi | ................... | G06F 3/044 |
| | | | | 345/174 |
| 2015/0324027 A1* | 11/2015 | Heo | ....................... | G06F 3/041 |
| | | | | 345/173 |
| 2016/0253036 A1* | 9/2016 | Yang | ....................... | G09G 3/20 |
| | | | | 345/174 |

FOREIGN PATENT DOCUMENTS

| | | |
|---|---|---|
| CN | 204288168 U | 4/2015 |
| CN | 104793777 A | 7/2015 |

\* cited by examiner

TOUCH CONTROL DISPLAY PANEL AND DISPLAY DEVICE

CROSS-REFERENCES TO RELATED APPLICATIONS

This application claims priority of Chinese Patent Application No. 201610617689.1, filed on Jul. 29, 2016, the entire contents of which are hereby incorporated by reference.

FIELD OF THE INVENTION

The present disclosure relates to the field of display technology and, more particularly, relates to a touch control display panel and a display device thereof.

BACKGROUND

Touch control display devices are able to detect the coordinates of a touch position on a screen by a finger, stylus, or other object, and to display corresponding information according to the detected coordinates. Touch control display devices enable users to interact directly with what is displayed, rather than using a mouse, touchpad, or any other intermediate devices, and, thus, have found wide applications in game consoles, personal computers, tablet computers, electronic voting machines, and smartphones, etc.

A current touch control display panel often includes a plurality of touch sensing electrodes and a plurality of touch driving electrodes intersecting the touch sensing electrodes. A capacitor is formed in an intersection area between the touch driving electrode and the touch sensing electrode, and a touch position is identified by detecting a capacitance change. The touch driving electrodes and the touch sensing electrodes are often made of transparent conductive glasses, such as indium tin oxide (ITO). However, ITO has a substantially large self-resistance. When the size of the touch control display panel is increased, the resistance of the touch driving electrodes and the touch sensing electrodes may be increased accordingly. Thus, the touch sensitivity of the touch control display panel may be degraded, and the touch detection time may become longer.

The disclosed touch control display panel and display device thereof are directed to solve one or more problems set forth above and other problems.

BRIEF SUMMARY OF THE DISCLOSURE

One aspect of the present disclosure provides a touch control display panel. The touch control display panel may comprise a plurality of touch driving electrodes arranged in a first direction; a touch sensing electrode array including a plurality of touch sensing electrode rows arranged in a second direction, wherein a touch sensing electrode row includes a first touch sensing electrode and a second touch sensing electrode arranged in the first direction and electrically insulated from each other. In a same touch sensing electrode row, a gap is provided between the first touch sensing electrode and the second touch sensing electrode, and the gap has a width of $w_1$ in the first direction, the touch driving electrode disposed opposite to and over the gap between the first touch sensing electrode and the second touch sensing electrode has an electrode width of $w_2$ in the first direction, and the gap width $w_1$ is smaller than the electrode width $w_2$.

Another aspect of the present disclosure provides a display device including the touch control display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

Figure 1:
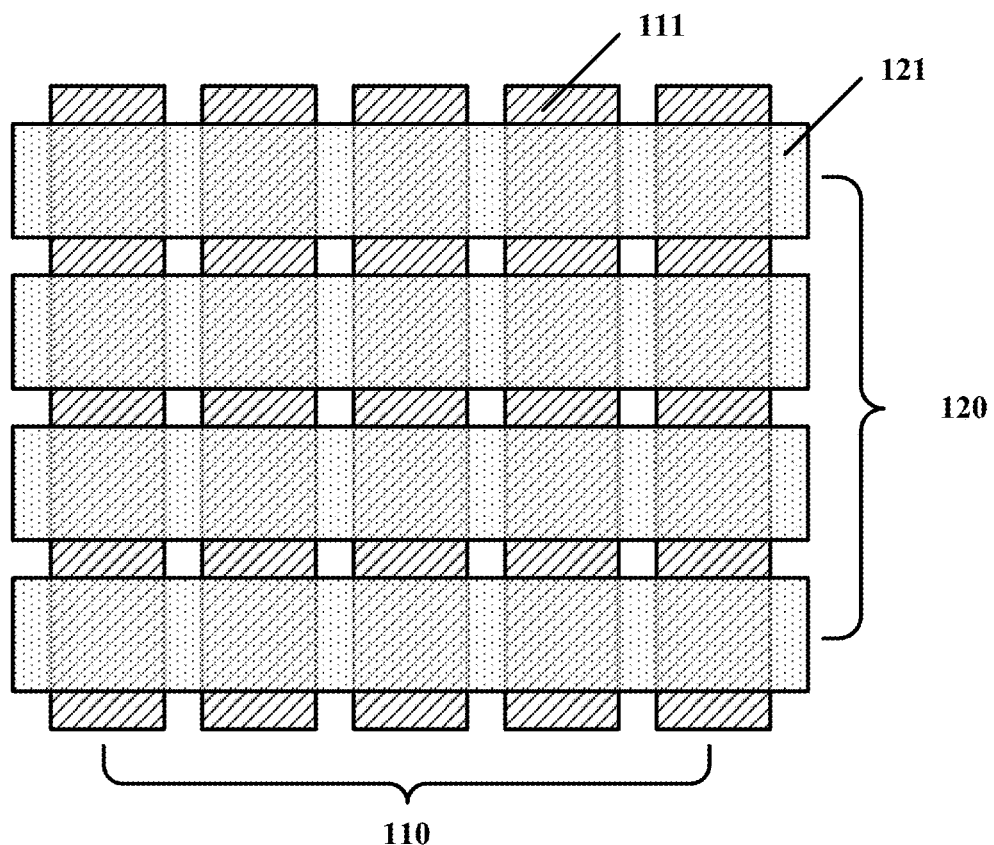
FIG. 1 illustrates an arrangement of a touch driving electrode array and a touch sensing electrode array in a current touch control display panel.

FIG. 1 illustrates an arrangement of a touch driving electrode array and a touch sensing electrode array in a current touch control display panel. As shown in FIG. 1, the touch control display panel comprises a touch driving electrode array 110 and a touch sensing electrode array 120. The touch driving electrode array 110 includes a plurality of stripe-shaped touch driving electrodes 111, and the touch sensing electrode array 120 includes a plurality of stripe-shaped touch sensing electrodes 121. Each touch driving electrode 111 intersects each touch sensing electrode 121, i.e., an intersection area is formed between each touch driving electrode 111 and each touch sensing electrode 121. Further, a capacitance is generated in the intersection area between the touch driving electrode 111 and the touch sensing electrode 121 and, accordingly, a touch position is identified by a change in the capacitance.

The touch driving electrodes 111 and the touch sensing electrodes 121 are often made of transparent conductive glasses, such as indium tin oxide (ITO). Because ITO has a substantially large self-resistance, when the touch control display panel having the touch driving electrodes and the touch sensing electrodes is made to have a large size, the resistance of the touch driving electrodes and the touch sensing electrodes may be further increased. Thus, the touch sensitivity of the touch control display panel may be reduced, the touch detection time may become longer, and the user experience may be degraded.

Figure 2:
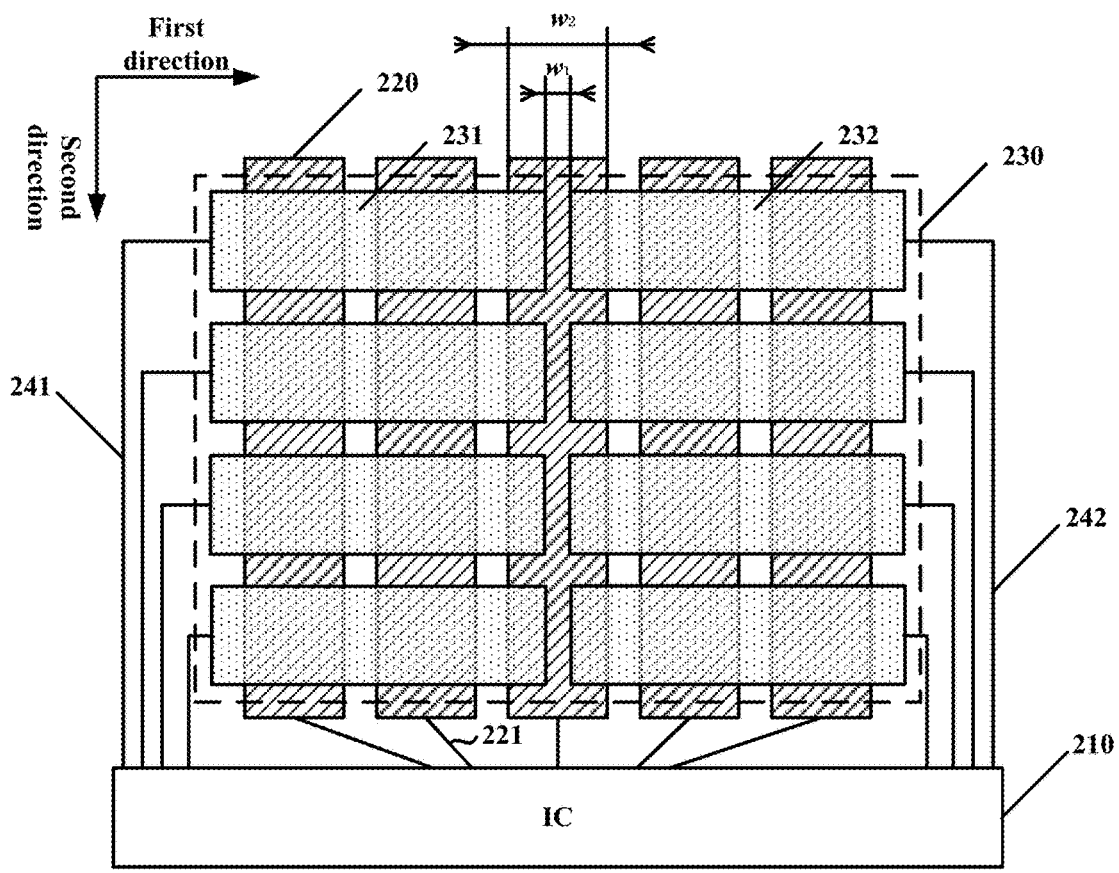
FIG. 2 illustrates an exemplary arrangement of a touch driving electrode array and a touch sensing electrode array in an exemplary touch control display panel consistent with disclosed embodiments.

The present disclosure provides an improved touch control display panel. FIG. 2 illustrates an exemplary arrangement of a touch driving electrode array and a touch sensing electrode array in an exemplary touch control display panel consistent with disclosed embodiments.

As shown in FIG. 2, the touch control display panel may include an integrated circuit 210, a touch driving electrode array including a plurality of touch driving electrodes 220, a touch scanning signal line group including a plurality of touch scanning signal lines 221, a touch sensing electrode array 230, and a touch sensing signal line group including a plurality of first touch sensing signal lines 241 and a plurality of second touch sensing signal lines 242. The integrated circuit 210 may be an appropriate controlling circuit and/or a driving circuit of the touch control display panel.

In particular, the touch driving electrodes 220 may be arranged in a first direction and parallel to each other. Each touch scanning signal line 221 may have a first end electrically connected to a corresponding touch driving electrode 220, and a second end electrically connected to the integrated circuit 210. Each touch scanning signal line 221 may provide a touch scanning signal to the corresponding touch driving electrode 220.

The touch sensing electrode array 230 may include a plurality of touch sensing electrode rows arranged in a second direction and parallel to each other. Each row in the touch sensing electrode array 230, i.e., each touch sensing electrode row, may include a first touch sensing electrode 231 and a second touch sensing electrode 232 arranged in the first direction. The first touch sensing electrode 231 and the second touch sensing electrode 232 may be electrically insulated from each other.

The touch sensing signal line group may include a plurality of first touch sensing signal lines 241 and a plurality of second touch sensing signal lines 242. Each first touch sensing signal line 241 may have a first end electrically connected to a corresponding first touch sensing electrode 231, and a second end electrically connected to the integrated circuit 210. Each second touch sensing signal line 242 may have a first end electrically connected to a corresponding second touch sensing electrode 232, and a second end electrically connected to the integrated circuit 210.

In a same touch sensing electrode row, a gap or a space may be provided between the first touch sensing electrode 231 and the second touch sensing electrode 232, and the gap may have a width of $w_1$ in the first direction. The touch driving electrode 220, which is disposed opposite to and over the gap between the first touch sensing electrode 231 and the second touch sensing electrode 232, may have an electrode width of $w_2$ in the first direction. In particular, in the first direction, the gap between the first touch sensing electrode 231 and the second touch sensing electrode 232 may have a smaller width than the touch driving electrode 220 disposed opposite to the gap, i.e., $w_1 < w_2$.

In one embodiment, as shown in FIG. 2, one touch driving electrode 220 having an electrode width of $w_2$ in the first direction may be disposed opposite to the gap between the first touch sensing electrode 231 and the second touch sensing electrode 232, and $w_1 < w_2$. In particular, when being projected onto the touch control display panel, an orthogonal projection of the gap may be at least partially overlapped with an orthogonal projection of the touch driving electrode 220 disposed opposite to and over the gap.

In another embodiment, two touch driving electrodes 220 each having have an electrode width of $w_2$ in the first direction may be disposed opposite to the gap between the first touch sensing electrode 231 and the second touch sensing electrode 232, and $w_1 < w_2$. In particular, when being projected onto the touch control display panel, an orthogonal projection of the gap may be at least partially overlapped with an orthogonal projection of the two touch driving electrode 220 disposed opposite to the gap.

Figure 13:
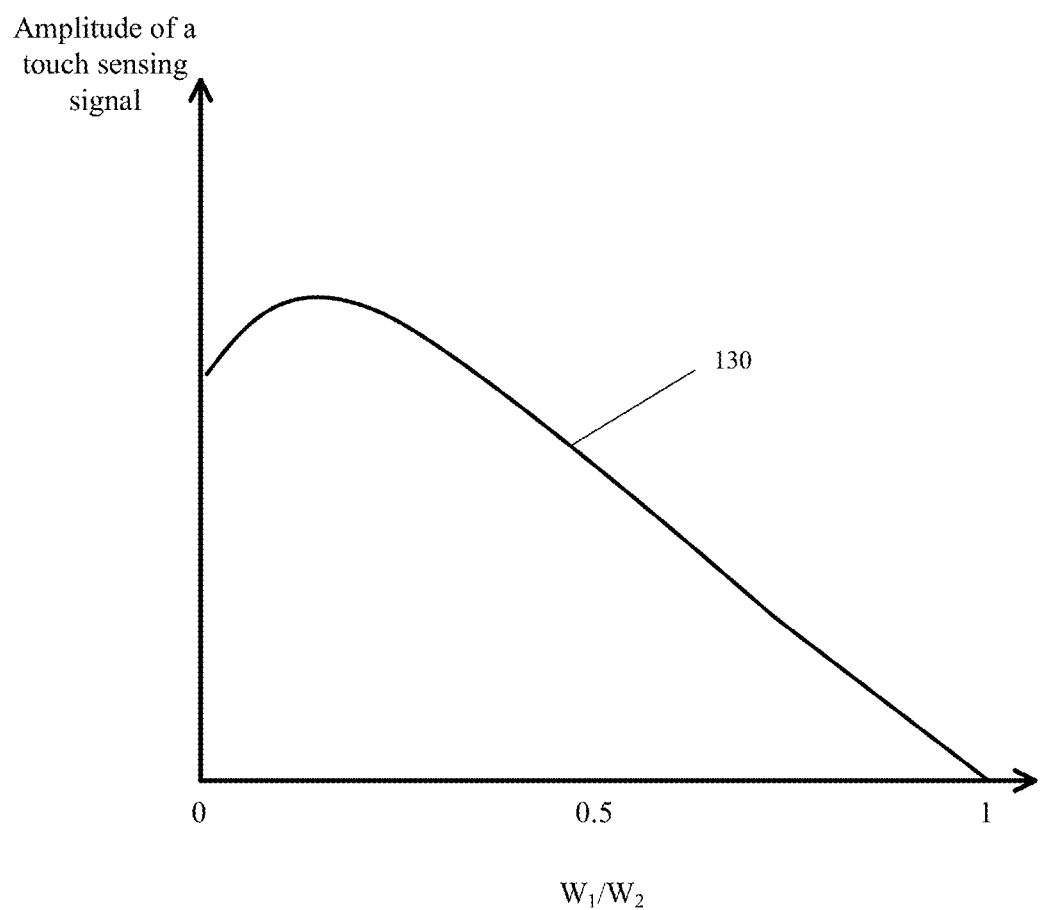
FIG. 13 illustrates an exemplary relationship between an amplitude of a touch sensing signal and a ratio between $w_1$ and $w_2$ in an exemplary touch control display panel consistent with disclosed embodiments.

Further, the ratio between $w_1$ and $w_2$, i.e., $w_1/w_2$, may be determined according to various application scenarios. FIG. 13 illustrates an exemplary relationship between an amplitude of a touch sensing signal and a ratio between $w_1$ and $w_2$ in an exemplary touch control display panel consistent with disclosed embodiments. As shown in FIG. 13, the curve 130 indicates a relationship between an amplitude of a touch sensing signal and $w_1/w_2$. The touch sensing signal may be collected by the integrated circuit from the touch sensing electrodes. As $w_1/w_2$ gradually increases from 0 to 1, the amplitude of the touch sensing signal collected from the touch sensing electrode may first increase to a maximum value and then decrease to approximately zero.

In the disclosed embodiments, each touch sensing electrode row may include a first touch sensing electrode 231 and a second touch sensing electrode 232 arranged in the first direction, and a gap may be provided between the first touch sensing electrode 231 and the second touch sensing electrode 232. Thus, provided that the touch detection accuracy of the touch control display panel remains substantially the same, the first touch sensing electrode 231 and the second touch sensing electrode 232 may have a reduced length in the first direction and, accordingly, the first touch sensing electrode 231 and the second touch sensing electrode 232 may have a reduced resistance. The touch sensing signal may be rapidly transmitted through the touch sensing signal line, and the touch sensitivity may be improved. On the other hand, provided that the touch sensitivity of the touch control display panel remains substantially the same, the touch sensing electrode array 230 may enable a larger size touch control display panel.

Further, because the gap between the first touch sensing electrode 231 and the second touch sensing electrode 232 may have a smaller width than the touch driving electrode 220 disposed opposite to the gap, i.e., $w_1 < w_2$, when an external object, e.g. a user's finger, touches the gap, the touch driving electrode 220 and the first touch sensing electrode 231 and/or the touch driving electrode 220 and the second touch sensing electrode 232 may still intersect to generate a capacitance for identifying a touch position. Thus, the touch detection accuracy of the touch control display panel may remain substantially the same, without being degraded by dividing the touch sensing electrode row into the electrically insulated first touch sensing electrode 231 and the second touch sensing electrode 232.

It should be noted that, the first direction and the second direction shown in FIG. 2 are for illustrative purposes and are not intended to limit the scope of the present disclosure. In one embodiment, the first direction may be perpendicular to the second direction. In another embodiment, the first direction may be not perpendicular to the second direction. The number and the shape of the touch sensing electrodes, and the number and the shape of touch driving electrodes shown in FIG. 2 are for illustrative purposes and are not intended to limit the scope of the present disclosure.

Figure 3:
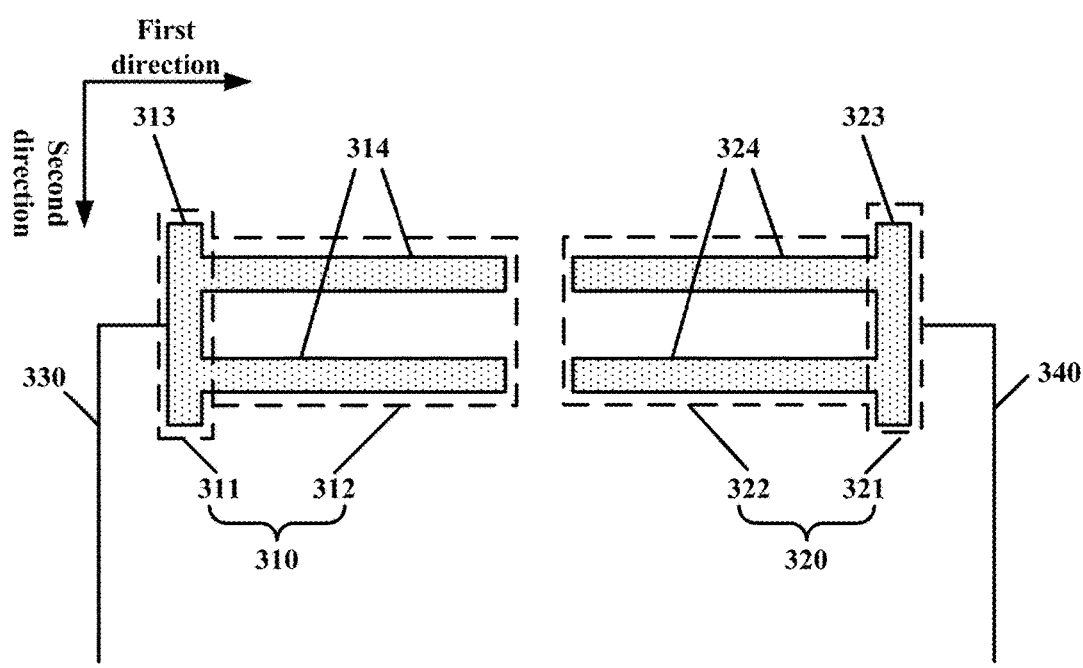
FIG. 3 illustrates an exemplary electrical connection between touch sensing electrodes and corresponding touch sensing signal lines in an exemplary touch control display panel consistent with disclosed embodiments.

A conductive layer including the touch sensing electrodes may be electrically connected to the touch sensing signal lines corresponding to the touch sensing electrodes in various ways. FIG. 3 illustrates an exemplary electrical connection between touch sensing electrodes and corresponding touch sensing signal lines in an exemplary touch control display panel consistent with disclosed embodiments.

As shown in FIG. 3, each first touch sensing electrode 310 may include a first electrode body 311 and a second electrode body 312, and each second touch sensing electrode 320 may include a first electrode body 321 and a second electrode body 322. In the first touch sensing electrode 310, the first electrode body 311 may include a first electrode branch 313 extending in the second direction, and the second electrode body 312 may include at least two second electrode branches 314 extending in the first direction. The two second electrode branches 314 may be arranged in parallel and may be disposed adjacent to each other in the second direction.

In the second touch sensing electrode 320, the first electrode body 321 may include a first electrode branch 323 extending in the second direction, and the second electrode body 322 may include at least two second electrode branches 324 extending in the first direction. The two second electrode branches 324 may be arranged in parallel and may be disposed adjacent to each other in the second direction.

Further, each second electrode branch may have a first end connected to the first electrode branch. In particular, the first end of the second electrode branch in the first touch sensing electrode may be an end far away from the second touch sensing electrode in the same touch sensing electrode row. The first end of the second electrode branch in the second touch sensing electrode may be an end far away from the first touch sensing electrode in the same touch sensing electrode row.

That is, in the first touch sensing electrode 310, the first electrode branch 313 may be connected to the first end of the second electrode branch 314 (e.g., the left end of the second electrode branch 314), and in the second touch sensing electrode 320, the first electrode branch 323 may be connected to the first end of the second electrode branch 324 (e.g., the right end of the second electrode branch 324).

Each first touch sensing signal line 330 may have a first end electrically connected to the first electrode branch 313 of the corresponding first touch sensing electrode 310. Each second touch sensing signal line 340 may have a first end electrically connected to the second electrode branch 323 of the corresponding second touch sensing electrode 320.

In one embodiment, as shown in FIG. 3, the first electrode branches 313 and 323, and the second electrode branches 314 and 324 may be a stripe-shaped electrode, respectively. In another embodiment, the first electrode branches 313 and 323, and the second electrode branches 314 and 324 may have a different shape, e.g., zig-zag shape. The shape of the first electrode branches 313 and 323, and the shape and the number of the second electrode branches 314 and 324 shown in FIG. 3 are for illustrative purposes and are not intended to limit the scope of the present disclosure.

Figure 4:
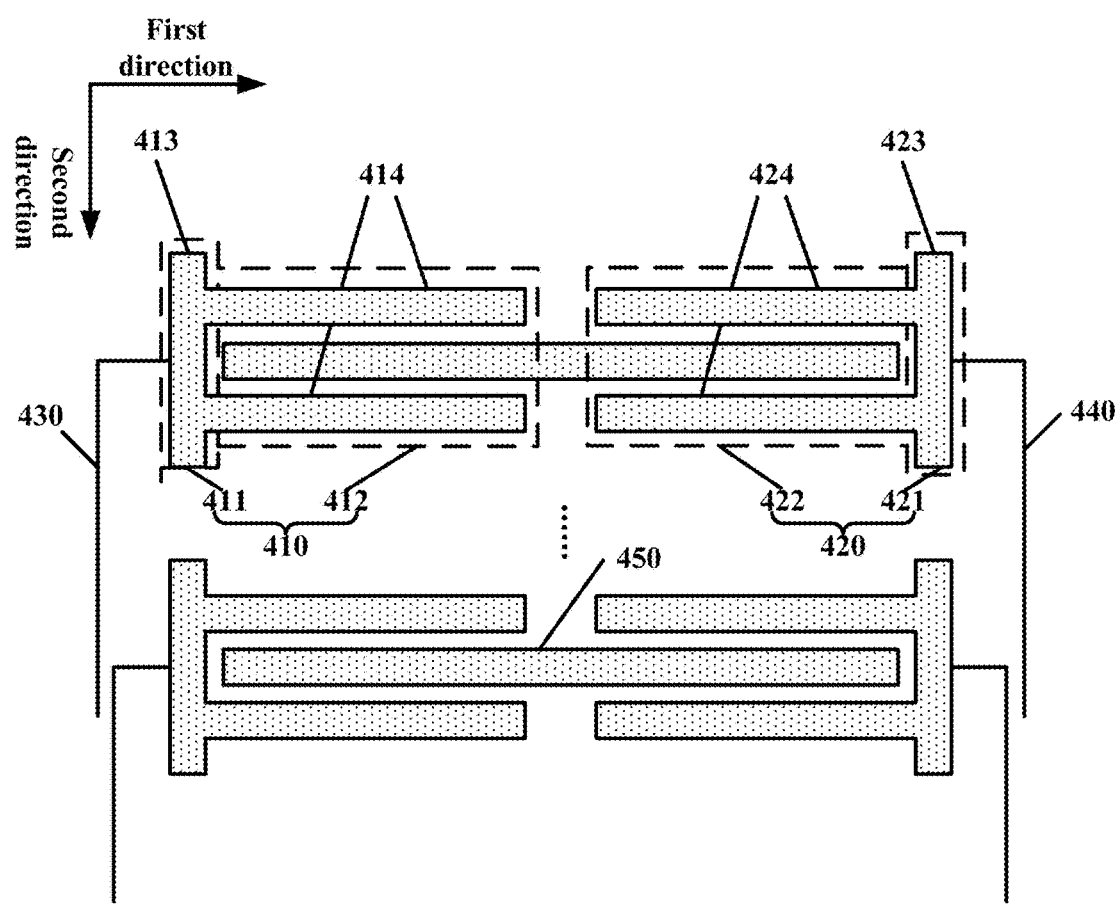
FIG. 4 illustrates another exemplary electrical connection between touch sensing electrodes and corresponding touch sensing signal lines in an exemplary touch control display panel consistent with disclosed embodiments.

FIG. 4 illustrates another exemplary electrical connection between touch sensing electrodes and corresponding touch sensing signal lines in an exemplary touch control display panel consistent with disclosed embodiments. The similarities between FIG. 3 and FIG. 4 are not repeated here, while certain differences may be explained.

As shown in FIG. 4, each first touch sensing electrode 410 may include a first electrode body 411 and a second electrode body 412, and each second touch sensing electrode 420 may include a first electrode body 421 and a second electrode body 422. In the first touch sensing electrode 410, the first electrode body 411 may include a first electrode branch 413 extending in the second direction, and the second electrode body 412 may include at least two second electrode branches 414 extending in the first direction. In the second touch sensing electrode 420, the first electrode body 421 may include a first electrode branch 423 extending in the second direction, and the second electrode body 422 may include at least two second electrode branches 424 extending in the first direction.

Further, in the first touch sensing electrode 410, the first electrode branch 413 may be connected to the first end of the second electrode branch 414, and each first touch sensing signal line 430 may have a first end electrically connected to the first electrode branch 413 of the corresponding first touch sensing electrode 410. In the second touch sensing electrode 420, the first electrode branch 423 may be connected to the first end of the second electrode branch 424, and each second touch sensing signal line 440 may have a first end electrically connected to the second electrode branch 423 of the corresponding second touch sensing electrode 420.

Different from the touch control display panel in FIG. 3, the touch control display panel in FIG. 4 may further include a dummy electrode array, which may be disposed in a same layer as the touch sensing electrode array. The dummy electrode array may include a plurality of dummy electrodes, and any dummy electrode may be electrically insulated from any first touch sensing electrode and any second touch sensing electrode.

Through disposing the dummy electrodes in the same conductive layer as the touch sensing electrode array, the conductive layer may exhibit substantially uniform optical properties, such that the user may be able to observe uniform images displayed on the touch control display panel. In addition, because the dummy electrode is electrically insulated from the first touch sensing electrode and the second touch sensing electrode in the touch sensing electrode array, the capacitive or the electric field generated between the touch sensing electrode and the touch driving electrode for detecting touch positions may not be affected.

In one embodiment, as shown in FIG. 4, the dummy electrode array may include a plurality of first dummy electrodes 450. In each touch sensing electrode row, at least one first dummy electrode 450 may be disposed between two second electrode branches adjacent in the second direction. As shown in FIG. 4, the first dummy electrode 450 may be disposed between the two second electrode branches 414 adjacent in the second direction and, meanwhile, disposed between the two second electrode branches 424 adjacent in the second direction.

Further, as shown in FIG. 4, the first dummy electrode 450 may extend from the first electrode branch 413 of the first touch sensing electrode 410 to the first electrode branch 423 of the second touch sensing electrode 420. That is, the first dummy electrode 450 may extend in the first direction. Thus, the first dummy electrode 450 may have a substantially long length, the optical uniformity of the conductive layer having the touch sensing electrode array may be further improved, and the image performance of the touch control display panel may be further enhanced.

It should be noted that, the number of the first dummy electrode 450 disposed between two second electrode branches 414 (424) adjacent in the second direction may change according to various application scenarios. The number and the shape of the first dummy electrode 450 disposed between two second electrode branches 414 (424) shown in FIG. 4 is for illustrative purposes and are not intended to limit the scope of the present disclosure.

Figure 5:
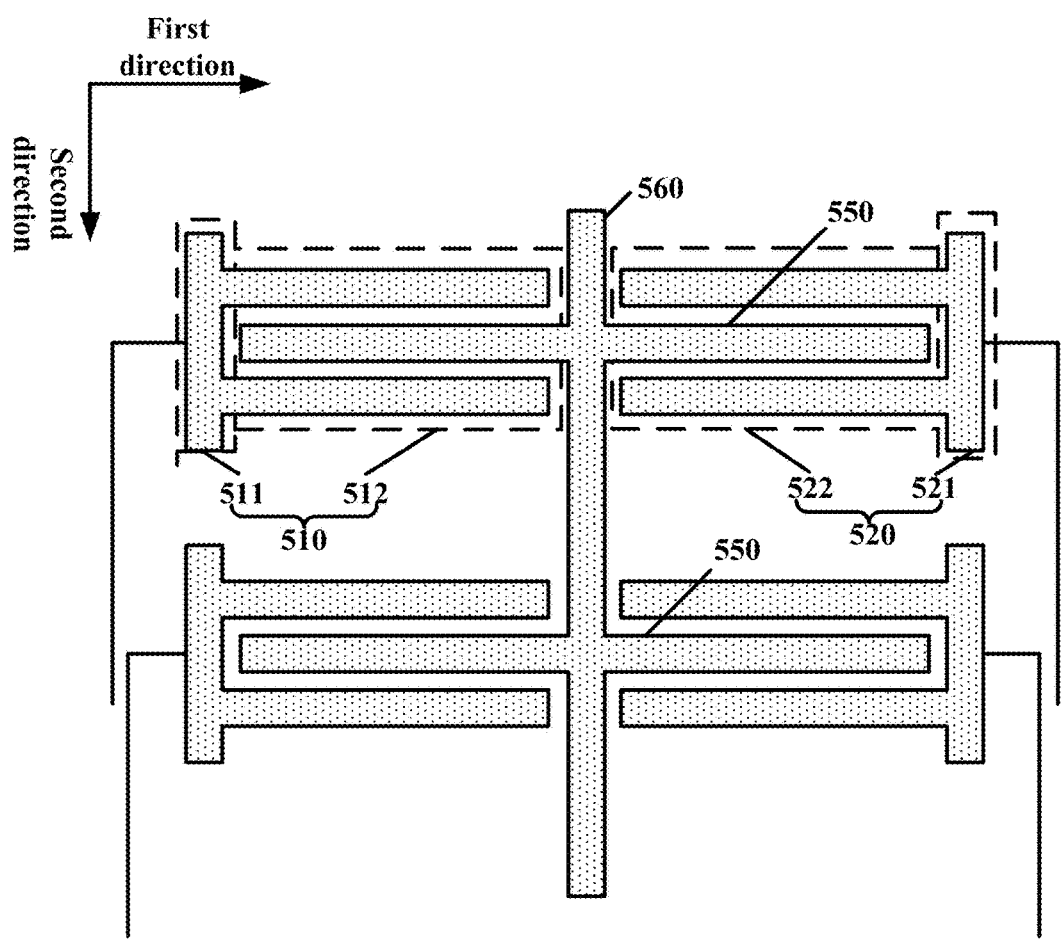
FIG. 5 illustrates another exemplary electrical connection between touch sensing electrodes and corresponding touch sensing signal lines in an exemplary touch control display panel consistent with disclosed embodiments.

FIG. 5 illustrates another exemplary electrical connection between touch sensing electrodes and corresponding touch sensing signal lines in an exemplary touch control display panel consistent with disclosed embodiments. The similarities between FIG. 5 and FIG. 4 are not repeated here, while certain differences may be explained.

Similar to the touch control display panel in FIG. 4, the touch control display panel in FIG. 5 may also include a dummy electrode array. Different from the touch control display panel in FIG. 4, the touch control display panel in FIG. 5 may further include at least one second dummy electrode 560 extending in the second direction. The second dummy electrode 560 may be disposed between the first touch sensing electrode 510 and the second touch sensing electrode 520.

In one embodiment, as shown in FIG. 5, the second dummy electrode 560 may be electrically connected to at least one first dummy electrode 550. In another embodiment, the second dummy electrode 560 may be electrically insulated from any first dummy electrode 550. Through disposing the second dummy electrode 560 extending in the second direction in the same conductive layer as the touch sensing electrode array, the optical uniformity of the conductive layer may be further improved, and the image performance of the touch control display panel may be further enhanced.

Figure 6:
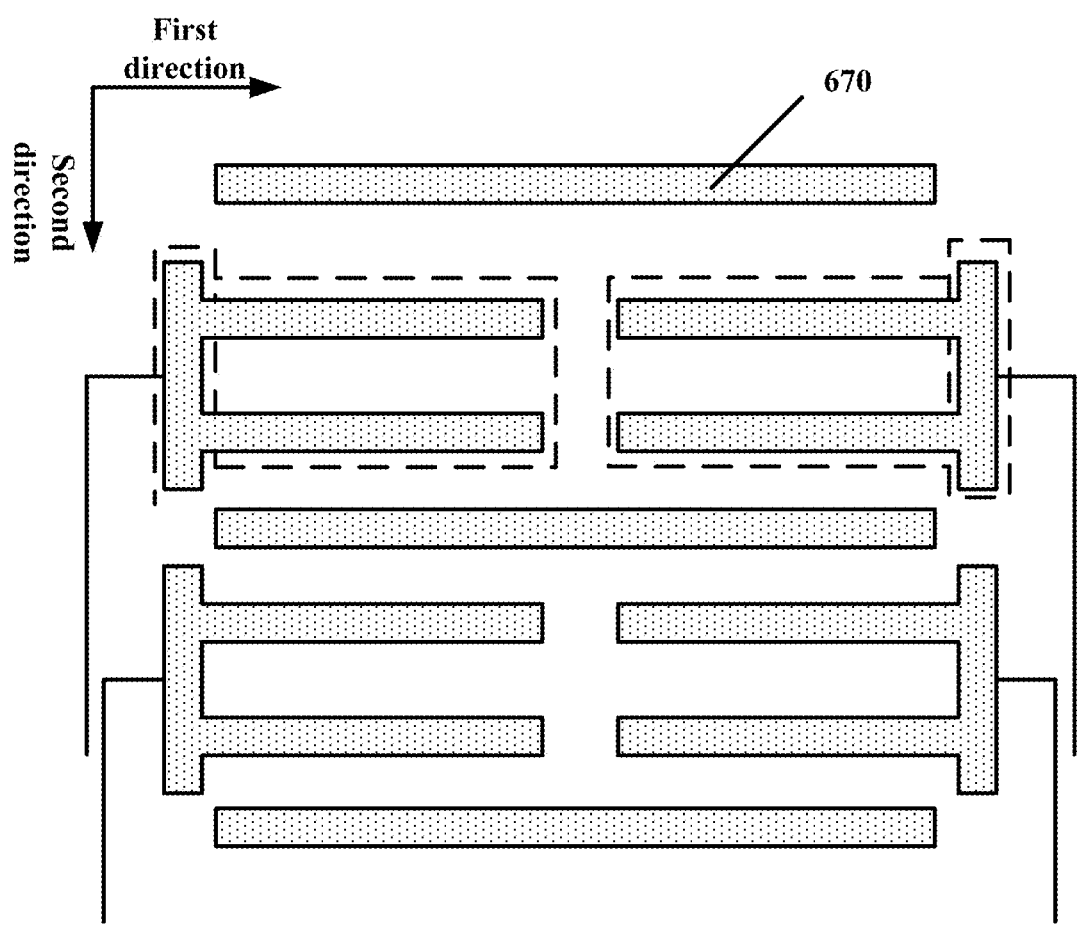
FIG. 6 illustrates another exemplary electrical connection between touch sensing electrodes and corresponding touch sensing signal lines in an exemplary touch control display panel consistent with disclosed embodiments.

FIG. 6 illustrates another exemplary electrical connection between touch sensing electrodes and corresponding touch sensing signal lines in an exemplary touch control display panel consistent with disclosed embodiments. The similarities between FIG. 6 and FIG. 4 are not repeated here, while certain differences may be explained below.

Similar to the touch control display panel in FIG. 4, the touch control display panel in FIG. 6 may also include a dummy electrode array. Different from the touch control display panel in FIG. 4, the touch control display panel in FIG. 6 may include a plurality of third dummy electrodes, and at least one third dummy electrode 670 extending in the first direction. The third dummy electrode 670 may be disposed between two adjacent touch sensing electrode rows. Through disposing the third dummy electrode 670 between two adjacent touch sensing electrode rows, the optical uniformity of the conductive layer having the touch sensing electrode array may be further improved, and image performance of the touch control display panel may be further enhanced.

It should be noted that, the dummy electrode array shown in FIG. 6 includes the third dummy electrode 670 without including the first dummy electrode and the second dummy electrode, which aims to illustrate the relative positions between the third dummy electrode 670 and the touch sensing electrode array, and is not intended to limit the scope of the present disclosure. In practical applications, the combination and arrangement of the first dummy electrode and/or second dummy electrode and/or the third dummy electrode may be determined according to various application scenarios.

Figure 7:
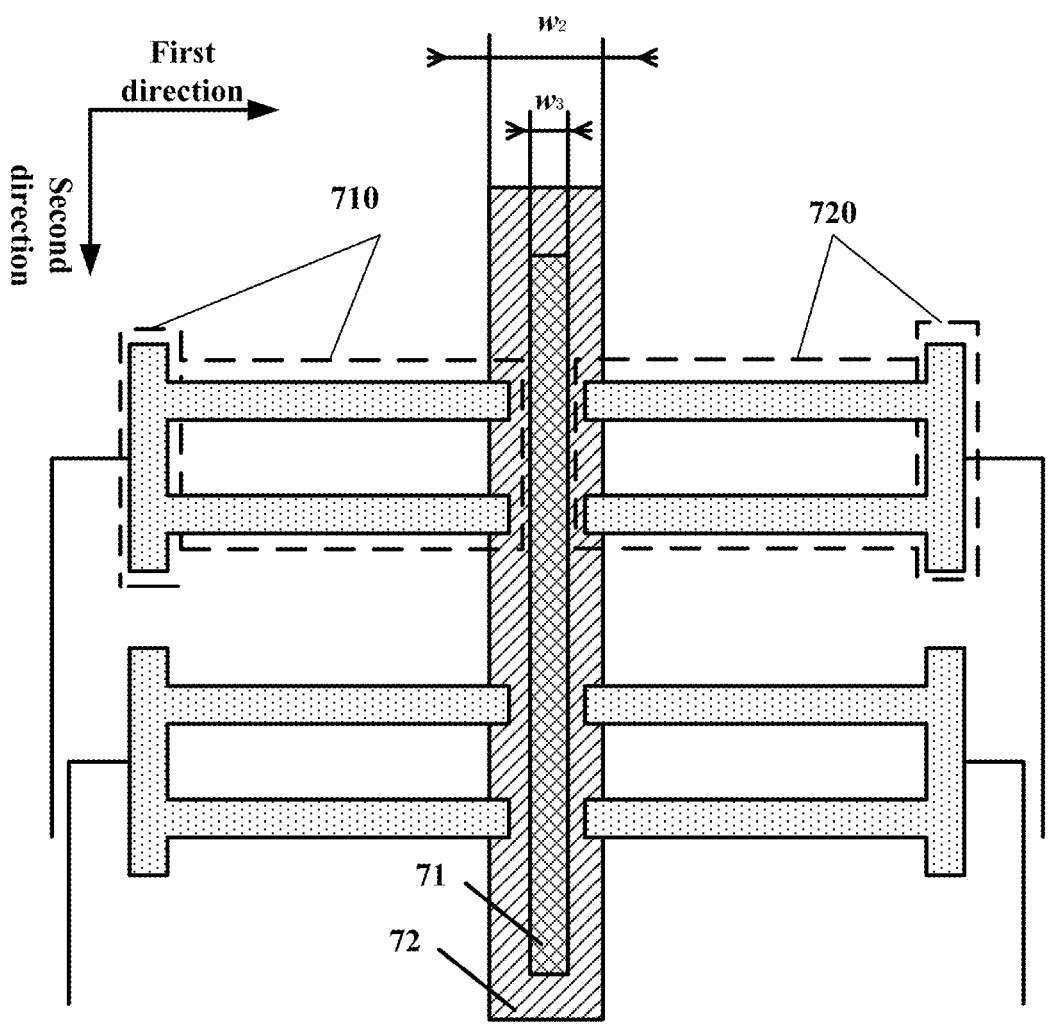
FIG. 7 illustrates another exemplary electrical connection between touch sensing electrodes and corresponding touch sensing signal lines in an exemplary touch control display panel consistent with disclosed embodiments.

FIG. 7 illustrates another exemplary electrical connection between touch sensing electrodes and corresponding touch sensing signal lines in an exemplary touch control display panel consistent with disclosed embodiments. The similarities between FIG. 7 and FIGS. 3-6 are not repeated here, while certain differences may be explained.

Different from the touch control display panel in FIGS. 3-6, the touch control display panel in FIG. 7 may further include a ground signal line 71 disposed in the same layer as the touch sensing electrode array. In particular, the ground signal line 71 may be disposed between the first touch sensing electrode 710 and the second touch sensing electrode 720, and may extend in the second direction. Through disposing the ground signal line 71 between the first touch sensing electrode 710 and the second touch sensing electrode 720, the interference between the first touch sensing electrode 710 and the second touch sensing electrode 720 may be suppressed, and the touch sensitivity and touch detection accuracy may be further improved.

In one embodiment, as shown in FIG. 7, in the first direction, the width $w_3$ of the ground signal line 71 may be narrower than the width $w_2$ of the touch driving electrode 72, i.e., $w_3 < w_2$.

In the disclosed embodiments, the ground signal line 71 may be disposed between the first touch sensing electrode 710 and the second touch sensing electrode 720. In the first direction, the width $w_3$ of the ground signal line 71 may be substantially narrow. Thus, the space or the distance between the first touch sensing electrode 710 and the second touch sensing electrode 720 may be substantially small. Accordingly, the touch sensing signals generated in the gap between the first touch sensing electrode 710 and the second touch sensing electrode 720 may be substantially large, the signal to noise ratio may be increased, and the tough detection error may be suppressed.

However, when the space between the first touch sensing electrode 710 and the second touch sensing electrode 720 is substantially large, the touch sensing signals generated in the gap between the first touch sensing electrode 710 and the second touch sensing electrode 720 may be substantially small, the signal to noise ratio may be reduced, and the tough detection errors may be increased.

Figure 8:
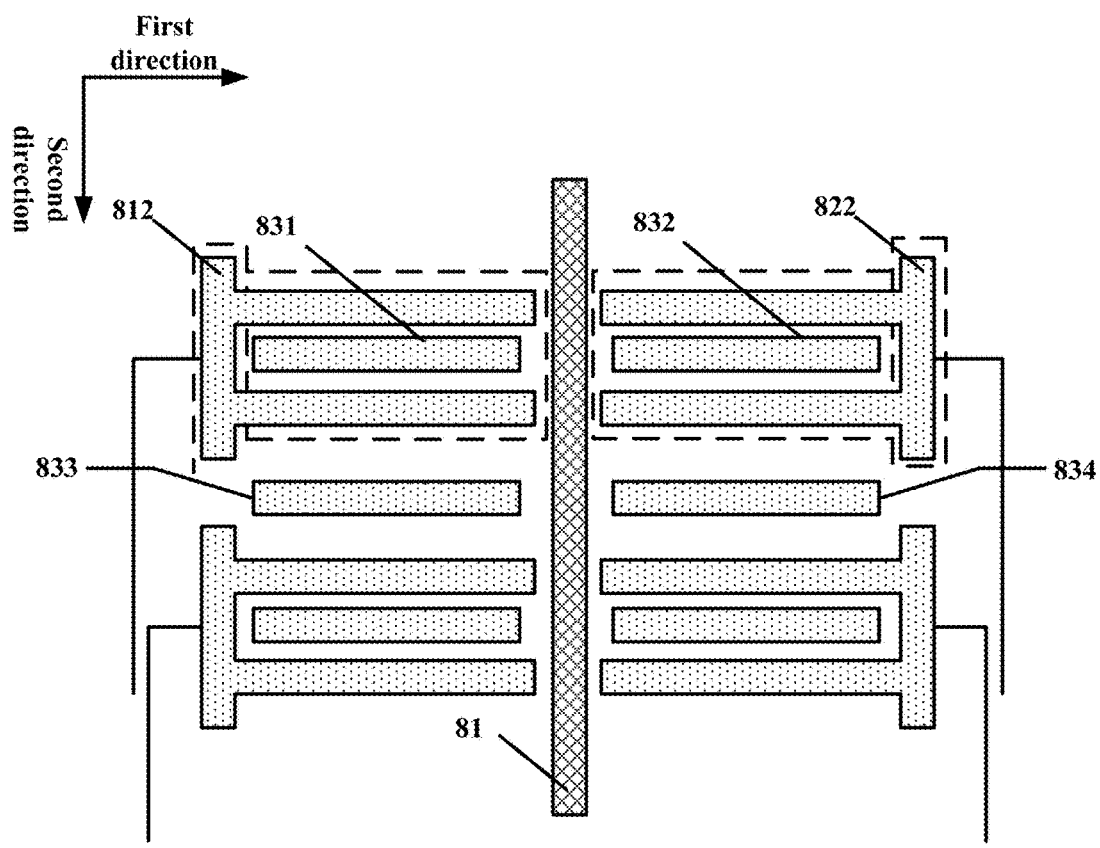
FIG. 8 illustrates another exemplary arrangement of a touch driving electrode array and a touch sensing electrode array having an exemplary electrical connection in FIG. 7 consistent with disclosed embodiments.

FIG. 8 illustrates another exemplary arrangement of a touch driving electrode array and a touch sensing electrode array having an exemplary electrical connection in FIG. 7 consistent with disclosed embodiments. The similarities between FIG. 7 and FIG. 8 are not repeated here, while certain differences may be explained.

In one embodiment, as shown in FIG. 8, the conductive layer having the touch sensing electrode array may be disposed with both a ground signal line and a dummy electrode array. For example, the dummy electrode array may include at least one fourth dummy electrode 831, which may be formed between a first electrode branch 812 of the first touch sensing electrode and a ground signal line 81. The dummy electrode array may also include at least one fifth dummy electrode 832, which may be formed between a first electrode branch 822 of the second touch sensing electrode and a ground signal line 81.

In certain embodiments, the dummy electrode array may further include at least one dummy electrode 833 disposed between adjacent two first touch sensing electrodes and/or at least one dummy electrode 834 disposed between adjacent two second touch sensing electrodes.

Figure 9:
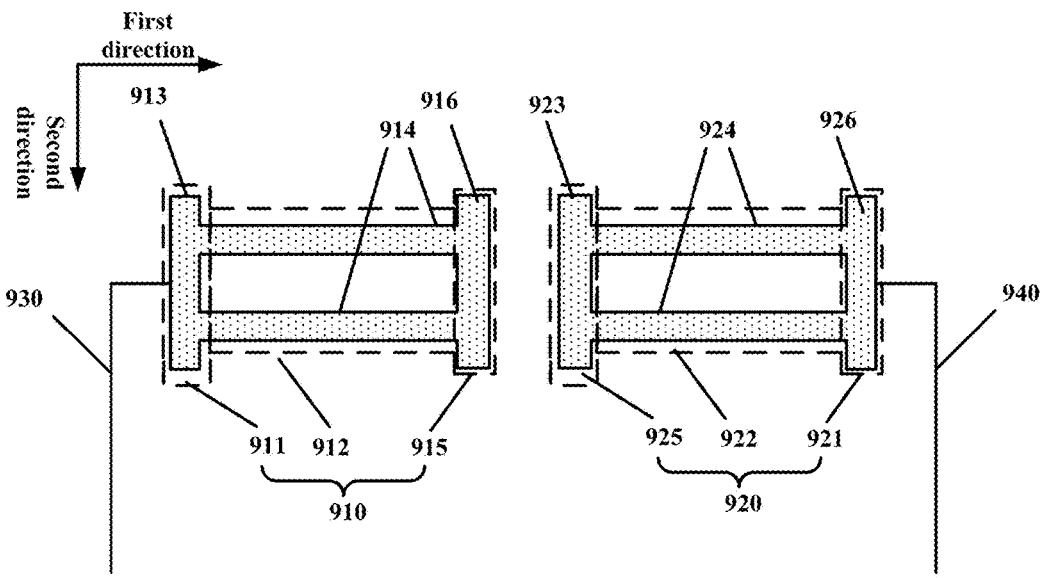
FIG. 9 illustrates another exemplary electrical connection between touch sensing electrodes and corresponding touch sensing signal lines in an exemplary touch control display panel consistent with disclosed embodiments.

FIG. 9 illustrates another exemplary electrical connection between touch sensing electrodes and corresponding touch sensing signal lines in an exemplary touch control display panel consistent with disclosed embodiments. The similarities between FIG. 3 and FIG. 9 are not repeated here, while certain differences may be explained.

As shown in FIG. 9, each first touch sensing electrode 910 may include a first electrode body 911 and a second electrode body 912, and each second touch sensing electrode 920 may include a first electrode body 921 and a second electrode body 922. In the first touch sensing electrode 910, the first electrode body 911 may include a first electrode branch 913 extending in the second direction, and the second electrode body 912 may include at least two second electrode branches 914 extending in the first direction. In the second touch sensing electrode 920, the first electrode body 921 may include a first electrode branch 923 extending in the second direction, and the second electrode body 922 may include at least two second electrode branches 924 extending in the first direction.

Further, each first touch sensing signal line 930 may have a first end electrically connected to the corresponding first electrode branch 913 of the first touch sensing electrode 910, and each second touch sensing signal line 940 may have a first end electrically connected to the corresponding second electrode branch 923 of the second touch sensing electrode 920.

Different from the touch control display panel in FIG. 3, in the touch control display panel in FIG. 9, the first touch sensing electrode 910 and the second touch sensing electrode 920 may further include a third electrode body 915 and a third electrode body 925, respectively. The third electrode body 915 may include a third electrode branch 916 extending in the second direction, and the third electrode body 925 may include a third electrode branch 926 extending in the second direction.

In the first touch sensing electrode 910, the third electrode branch 916 may be electrically connected to a second end of each of the two adjacent second electrode branches 914. In the second touch sensing electrode 920, the third electrode branch 926 may be electrically connected to a second end of each of the two adjacent second electrode branches 924.

In particular, the second end of the second electrode branch 914 in the first touch sensing electrode 910 may be an end close to the second touch sensing electrode 920 in the same touch sensing electrode row, and the second end of the second electrode branch 924 in the second touch sensing electrode 920 may be an end close to the first touch sensing electrode 910 in the same touch sensing electrode row.

For example, as shown in FIG. 9, the second end of the second electrode branch 914 in the first touch sensing electrode 910 may be a right end of the second electrode branch 914 in the first touch sensing electrode 910, and the second end of the second electrode branch 924 in the second touch sensing electrode 920 may be a left end of the second electrode branch 924 in the second touch sensing electrode 920.

Because the second end of the second electrode branch 914 is electrically connected to the third electrode branch 916, the second electrode branch 914 and the first touch sensing electrode 910 may be prevented from forming overlapped touch driving electrodes. Thus, the second touch sensing electrode 920 may be no longer affected by the overlapped touch driving electrodes formed by the second electrode branch 914 and the first touch sensing electrode 910.

Similarly, because the second end of the second electrode branch 924 is electrically connected to the third electrode branch 926, the second electrode branch 924 and the second touch sensing electrode 920 may be prevented from forming overlapped touch driving electrodes. Thus, the first touch sensing electrode 910 may be no longer affected by the overlapped touch driving electrodes formed by the second electrode branch 924 and the second touch sensing electrode 920.

In certain embodiments, in each touch sensing electrode, along the second direction, the length of the third electrode branch may be equal to or smaller than the length of the second electrode body. The corresponding structure may be illustrated in FIG. 10, which illustrates another exemplary arrangement of a touch driving electrode array and a touch sensing electrode array having an exemplary electrical connection in FIG. 9 consistent with disclosed embodiments. The similarities between FIG. 10 and FIG. 9 are not repeated here, while certain differences may be explained.

Figure 10:
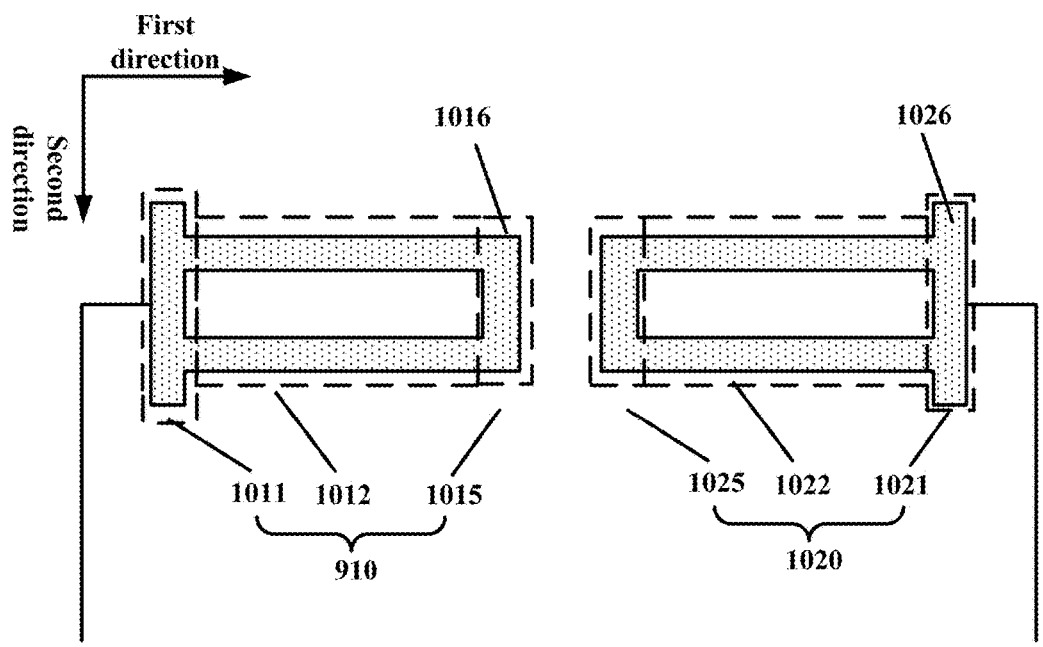
FIG. 10 illustrates another exemplary arrangement of a touch driving electrode array and a touch sensing electrode array having an exemplary electrical connection in FIG. 9 consistent with disclosed embodiments.

As shown in FIG. 10, in the second direction, the length of a third electrode branch 1016 in a first touch sensing electrode 1010 may be equal to or smaller than the length of a second electrode body 1012 in the first touch sensing electrode 1010. Similarly, in the second direction, the length of a third electrode branch 1026 in a second touch sensing electrode 1020 may be equal to or smaller than the length of a second electrode body 1022 in the second touch sensing electrode 1020.

The touch control display panel in FIGS. 9-10 may also include a dummy electrode array (not drawn in FIGS. 9-10). For example, in one embodiment, the dummy electrode array may include at least one sixth dummy electrode extending in the first direction. The sixth dummy electrode may extend from the first electrode branch of the first touch sensing electrode to the third electrode branch of the first touch sensing electrode. In another embodiment, the dummy electrode array may further include at least one seventh dummy electrode extending in the first direction. The seventh dummy electrode may extend from the first electrode branch of the second touch sensing electrode to the third electrode branch of the second touch sensing electrode.

In another embodiment, the dummy electrode array may include at least one dummy electrode disposed between two adjacent touch sensing electrode rows. In another embodiment, the dummy electrode array may include at least one dummy electrode disposed between the first touch sensing electrode and the second touch sensing electrode, and disposed extending in the second direction.

In practical applications, the combination and arrangement of the sixth dummy electrode, and/or seventh dummy electrode, and/or the dummy electrode disposed between two adjacent touch sensing electrode rows, and/or the dummy electrode disposed between the first touch sensing electrode and the second touch sensing electrode and disposed extending in the second direction, may be determined according to various application scenarios.

Figure 11:
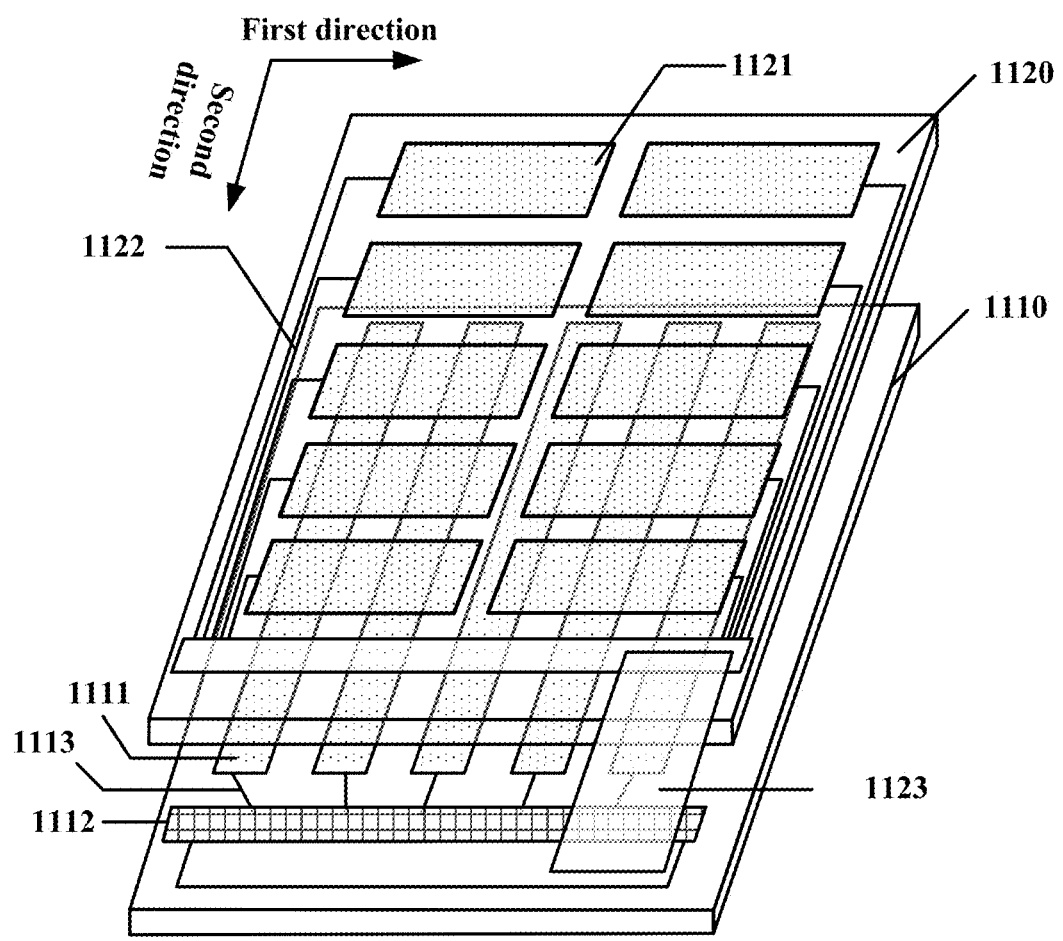
FIG. 11 illustrates an exemplary touch control display panel consistent with disclosed embodiments.

FIG. 11 illustrates another touch control display panel consistent with disclosed embodiments. As shown in FIG. 11, the touch display panel may include an array substrate 1110, a color film substrate 1120 arranged opposite to the array substrate 1110, display medium (not drawn in FIG. 11) sandwiched between the array substrate 1110 and the color film substrate 1120, an integrated circuit 1112, a plurality of touch scanning signal lines 1113, and a plurality of touch sensing signal lines 1114. An inner surface of the array substrate 1110 may be facing an inner surface of the color film substrate 1120. Other components may also be included.

In one embodiment, the display medium may be liquid crystal material. In another embodiment, the display medium may be plasma display panel (PDP) display medium, field emission display (FED) display medium, organic light-emitting diode (OLED) display medium, light-emitting diode (LED) display medium, quantum dots (QDs) display medium, electrophoretic display medium or other appropriate display medium capable of displaying videos and/or images.

In one embodiment, as shown in FIG. 11, a touch driving electrode array include a plurality of touch driving electrodes 1111 may be disposed on the array substrate 1110, and a touch sensing electrode array include a plurality of touch sensing electrodes 1121 may be disposed on the color film substrate 1120. In particular, the touch sensing electrodes 1121 may be disposed on a surface of the color film substrate 1120 far away from the array substrate 1110, and the touch driving electrodes 1111 may be disposed on a surface of the array substrate 1110 facing the color film substrate 1120.

For example, as shown in FIG. 11, the touch sensing electrodes 1121 may be disposed on the outer surface of the color film substrate 1120, and the touch driving electrodes 1111 may be disposed on the inner surface of the array substrate 1110. That is, the touch control display panel may be a hybrid-cell touch control display panel. In another embodiment, the touch control display panel may be an in-cell touch control display panel. In another embodiment, the touch control display panel may be an on-cell touch control display panel.

Further, the array substrate 1110 may also include a plurality of scanning lines (not drawn in FIG. 11) and a plurality of data lines (not drawn in FIG. 11). The scanning lines may intersect or cross the data lines to form a pixel array. The scanning lines may extend in the first direction, and the data lines may extend in the second direction. That is, the touch driving electrode 1111 may extend in the same direction as the data lines, and the touch sensing electrode 1121 may extend in the same direction as the scanning lines.

Each touch scanning signal line 1113 may have a first end electrically connected to the corresponding touch driving electrode 1111, and a second end electrically connected to the integrated circuit 1112. Similarly, each touch sensing signal line 1122 may have a first end electrically connected to the corresponding touch sensing electrode 1121, and a second end electrically connected to the integrated circuit 1112. When the touch sensing signal lines 1122 are disposed on the color film substrate 1120 and the integrated circuit 1112 is disposed on the array substrate 1110, to realize the electrical connection between the touch sensing signal lines 1122 and the integrated circuit 1112, a flexible printed circuit (FPC) may be provided to electrically connect the touch sensing signal lines 1122 and the integrated circuit 1112.

In a touch stage, the integrated circuit 1112 may provide the touch scanning signal to the touch driving electrodes 1111 and, meanwhile, receive the touch sensing signal from the touch sensing electrodes 1121. For example, in the touch stage, the integrated circuit 1112 may sequentially provide the touch scanning signal to each touch driving electrode 1111, while simultaneously collect the touch sensing signals from all the touch sensing electrodes 1121. According to various touch sensing signals received from the touch sensing electrodes 1121, the integrated circuit 1112 may be able to identity the touch position.

In one embodiment, the touch sensing signal lines 1122 and the touch sensing electrodes 1121 may be disposed in a same conductive layer. In another embodiment, the touch sensing signal lines 1122 and the touch sensing electrodes 1121 may be disposed in different conductive layers, and each touch sensing signal line 1122 may be electrically connected to the corresponding touch sensing electrode 1121 through various ways. For example, each touch sensing signal line 1122 may be directly electrically connected to the corresponding touch sensing electrode 1121, or indirectly electrically connected to the corresponding touch sensing electrode 1121, e.g., via a through-hole disposed in an insulating layer between the conductive layer having the touch sensing signal lines 1122 and the conductive layer having the touch sensing electrodes 1121.

In one embodiment, in a display stage, the touch driving electrodes 1111 may be multiplexed as a common electrode, for example, through a time-divisional driving method, and the integrated circuit 1112 may also provide a common voltage signal to each touch driving electrode 1111. Thus, the liquid crystal molecules in the liquid crystal display medium (not drawn in FIG. 11) may be deflected under an electric filed generated between the common electrode and pixel electrodes, displaying predetermined images. In another embodiment, the touch driving electrodes 1111 may not be multiplexed as a common electrode, i.e., the touch driving electrodes 1111 may be different from the common electrode.

It should be noted that, FIG. 11 shows the touch driving electrodes 1111 are disposed on the array substrate 1110, while the touch sensing electrodes 1121 are disposed on the color film substrate 1120, which is for illustrative purposes and are not intended to limit the scope of the present disclosure. In practical applications, the position of the touch driving electrodes and the touch sensing electrodes may be configured according to various application scenarios. In one embodiment, both the touch driving electrodes and the touch sensing electrodes may be disposed on the array substrate.

In another embodiment, both the touch driving electrodes and the touch sensing electrodes may be disposed on the color film substrate. In another embodiment, the touch driving electrodes and/or the touch sensing electrodes may be disposed on another appropriate substrate different from the array substrate and color film substrate, for example, when the display medium is OLED display medium, the ouch driving electrodes and the touch sensing electrodes may be disposed on a cover glass plate.

Figure 12:
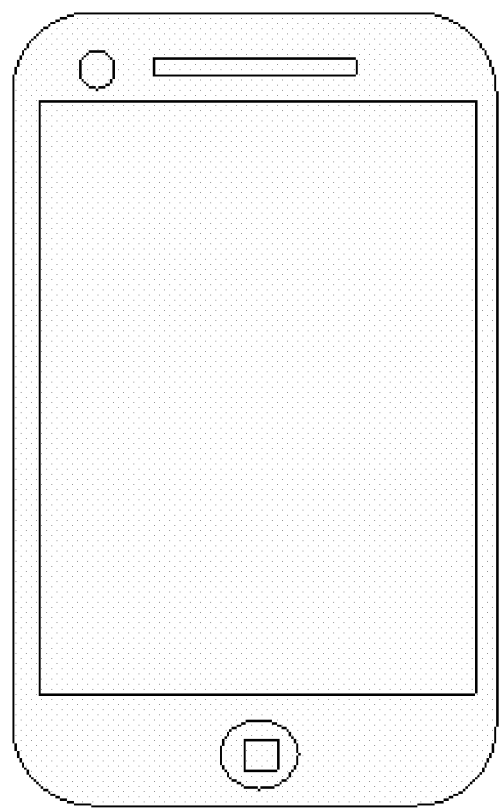
FIG. 12 illustrates a top view of an exemplary display device consistent with disclosed embodiments.

The present disclosure further provides a display device including any of the disclosed touch control display panels. FIG. 12 illustrates an exemplary display device consistent with disclosed embodiments. The display device may comprise any of the disclosed touch control display panels. Other components may also be included. The display device may be a smart wearable device, a tablet, a TV, a smartphone, a notebook, and, a digital frame, etc. Further, the display device may be any appropriate type of content-presentation devices. Because the display device may comprise any of the disclosed touch control display panels, the display device may also exhibit the same advantages as the disclosed touch control display panels, which are not repeated here.

In the disclosed embodiments, each touch sensing electrode row may include a first touch sensing electrode and a second touch sensing electrode arranged in the first direction, and a gap may be provided between the first touch sensing electrode and the second touch sensing electrode. On one hand, provided that the touch detection accuracy of the touch control display panel remains substantially the same, the first touch sensing electrode and the second touch sensing electrode may have a reduced length in the first direction and, accordingly, the first touch sensing electrode and the second touch sensing electrode may have a reduced resistance. The touch sensing signal may be rapidly transmitted through the touch sensing signal line, and the touch sensitivity may be improved. On the other hand, provided that the touch sensitivity of the touch control display panel remains substantially the same, the touch sensing electrode array may enable a larger size touch control display panel.

Because the gap between the first touch sensing electrode and the second touch sensing electrode may have a smaller width than the touch driving electrode disposed opposite to the gap, when the user's finger touches the gap, the touch driving electrode and the first touch sensing electrode and/or the touch driving electrode and the second touch sensing electrode may still intersect to generate a capacitance for identifying a touch position. Thus, the touch detection accuracy of the touch control display panel may remain substantially the same, without being degraded by dividing the touch sensing electrode row into the electrically insulated first touch sensing electrode and the second touch sensing electrode.

Future, through disposing the dummy electrodes in the same conductive layer as the touch sensing electrode array, the conductive layer may exhibit substantially uniform optical properties, such that the user may be able to observe uniform images displayed on the touch control display panel. In addition, because any dummy electrode is electrically insulated from any first touch sensing electrode and any second touch sensing electrode in the touch sensing electrode array, the capacitive or the electric field generated between the touch sensing electrode and the touch driving electrode for detecting touch positions may not be affected.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A touch control display panel, comprising:
   a plurality of touch driving electrodes arranged in a first direction;
   a touch sensing electrode array including a plurality of touch sensing electrode rows arranged in a second direction, wherein a touch sensing electrode row includes a first touch sensing electrode and a second touch sensing electrode arranged in the first direction and electrically insulated from each other; and
   a ground signal line, extending along the second direction, disposed between the first touch sensing electrode and the second touch sensing electrode, wherein:
   in a same touch sensing electrode row, a gap is provided between the first touch sensing electrode and the second touch sensing electrode, and the gap has a width of $w_1$ in the first direction,
   the touch driving electrode disposed opposite to and over the gap between the first touch sensing electrode and the second touch sensing electrode has an electrode width of $w_2$ in the first direction, and the gap width $w_1$ is smaller than the electrode width $w_2$, and
   along the first direction, the ground signal line completely overlaps with the touch driving electrode.

2. The touch control display panel according to claim 1, further including:
   an integrated circuit controlling the touch control display panel;
   a touch scanning signal line group including a plurality of touch scanning signal lines, wherein a touch scanning signal line has a first end electrically connected to a corresponding touch driving electrode and a second end electrically connected to the integrated circuit, and the touch scanning signal line provide a touch scanning signal to the corresponding touch driving electrode; and
   a touch sensing signal line group including a plurality of first touch sensing signal lines and a plurality of second touch sensing signal lines, wherein a first touch sensing signal line has a first end electrically connected to a corresponding first touch sensing electrode, and a second end electrically connected to the integrated circuit, and a second touch sensing signal line has a first end electrically connected to a corresponding second touch sensing electrode, and a second end electrically connected to the integrated circuit.

3. The touch control display panel according to claim 2, wherein:
   each of the first touch sensing electrode and second touch sensing electrode includes a first electrode body and a second electrode body, wherein the first electrode body includes a first electrode branch extending in the second direction, and the second electrode body includes at least two second electrode branches extending in the first direction;
   the second electrode branch has a first end electrically connected to the first electrode branch, wherein the first end of the second electrode branch in the first touch sensing electrode is an end far away from the second touch sensing electrode in the same touch sensing electrode row, and the first end of the second electrode branch in the second touch sensing electrode is an end far away from the first touch sensing electrode in the same touch sensing electrode row;
   the first touch sensing signal line has the first end electrically connected to the first electrode branch of the corresponding first touch sensing electrode; and
   the second touch sensing signal line has the first end electrically connected to the second electrode branch of the corresponding second touch sensing electrode.

4. The touch control display panel according to claim 3, further including:
a dummy electrode array disposed in a same layer as the touch sensing electrode array and including a plurality of dummy electrodes, wherein the dummy electrode is electrically insulated from the first touch sensing electrode and the second touch sensing electrode.

5. The touch control display panel according to claim 4, wherein the dummy electrode array further includes:
a plurality of first dummy electrodes, wherein in the touch sensing electrode row, at least one first dummy electrode is disposed between two second electrode branches adjacent in the second direction.

6. The touch control display panel according to claim 5, wherein:
the at least one first dummy electrode extends from the first electrode branch of the first touch sensing electrode to the first electrode branch of the second touch sensing electrode.

7. The touch control display panel according to claim 5, wherein the dummy electrode array further includes:
at least one second dummy electrode extending in the second direction and disposed between the first touch sensing electrode and the second touch sensing electrode.

8. The touch control display panel according to claim 7, wherein:
the at least one second dummy electrode is electrically connected to at least one of the plurality of first dummy electrodes.

9. The touch control display panel according to claim 4, wherein the dummy electrode array further includes:
a plurality of third dummy electrodes extending in the first direction, where at least one third dummy electrode is disposed between two adjacent touch sensing electrode rows.

10. The touch control display panel according to claim 4, wherein:
the ground signal line is disposed in a same layer as the touch sensing electrode array, wherein the ground signal line is disposed between the first touch sensing electrode and the second touch sensing electrode, and extending in the second direction.

11. The touch control display panel according to claim 10, wherein:
the ground signal line has a width of $w_3$ in the first direction; and
$w_3 < w_2$.

12. The touch control display panel according to claim 10, wherein the dummy electrode array further includes:
at least one fourth dummy electrode formed between the first electrode branch of the first touch sensing electrode and the ground signal line; and
at least one fifth dummy electrode formed between the first electrode branch of the second touch sensing electrode and the ground signal line.

13. The touch control display panel according to claim 3, wherein:
the first touch sensing electrode and the second touch sensing electrode further include a third electrode body respectively, and the third electrode body includes a third electrode branch extending in the second direction;
in the first touch sensing electrode, the third electrode branch is electrically connected to a second end of the second electrode branch; and
in the second touch sensing electrode, the third electrode branch is electrically connected to a second end of the second electrode branch,
wherein the second end of the second electrode branch in the first touch sensing electrode is an end close to the second touch sensing electrode in the same touch sensing electrode row, and
the second end of the second electrode branch in the second touch sensing electrode is an end close to the first touch sensing electrode in the same touch sensing electrode row.

14. The touch control display panel according to claim 13, wherein:
in the second direction, a length of the third electrode branch in the first touch sensing electrode is equal to or smaller than a length of the second electrode body in the first touch sensing electrode; and
in the second direction, a length of the third electrode branch in the second touch sensing electrode is equal to or smaller than a length of the second electrode body in the second touch sensing electrode.

15. The touch control display panel according to claim 13, wherein the dummy electrode array further includes:
at least one sixth dummy electrode extending in the first direction, and extending from the first electrode branch of the first touch sensing electrode to the third electrode branch of the first touch sensing electrode; and
at least one seventh dummy electrode extending in the first direction and extending from the first electrode branch of the second touch sensing electrode to the third electrode branch of the second touch sensing electrode.

16. The touch control display panel according to claim 1, further including:
a color film substrate; and
an array substrate;
wherein the plurality of touch driving electrodes are disposed on the array substrate, and the touch sensing electrode array is disposed on the color film substrate,
a plurality of scanning lines and a plurality of scanning lines intersecting the scanning liens are formed on the array substrate, and
each scanning line extends in the first direction, and each data line extends in the second direction.

17. The touch control display panel according to claim 16, wherein:
in a display stage, the plurality of touch driving electrodes are multiplexed as a common electrode, and an integrated circuit provides a common voltage signal to the plurality of touch driving electrodes.

18. The touch control display panel according to claim 1, further including:
a color film substrate; and
an array substrate,
wherein the plurality of touch driving electrodes and the touch sensing electrode array are disposed on the array substrate, or the plurality of touch driving electrodes and the touch sensing electrode array are disposed on the color film substrate.

19. A display device comprising the touch control display panel according to claim 1.

20. A touch control display panel, comprising:
a plurality of touch driving electrodes arranged in a first direction;
a touch sensing electrode array including a plurality of touch sensing electrode rows arranged in a second direction, wherein a touch sensing electrode row includes a first touch sensing electrode and a second touch sensing electrode arranged in the first direction and electrically insulated from each other;

a dummy electrode array disposed in a same layer as the touch sensing electrode array; and a ground signal line, extending along the second direction, disposed between the first touch sensing electrode and the second touch sensing electrode, wherein:

in a same touch sensing electrode row, a gap is provided between the first touch sensing electrode and the second touch sensing electrode, and the gap has a width of $w_1$ in the first direction, the touch driving electrode disposed opposite to and over the gap between the first touch sensing electrode and the second touch sensing electrode has an electrode width of $w_2$ in the first direction, and the gap width $w_1$ is smaller than the electrode width $w_2$, the dummy electrode array includes at least one fourth dummy electrode formed between a first electrode branch of the first touch sensing electrode and the ground signal line, and at least one fifth dummy electrode formed between a first electrode branch of the second touch sensing electrode and the ground signal line, and along the first direction, the ground signal line completely overlaps with the touch driving electrode.

* * * * *